(12) United States Patent
Härkegård et al.

(10) Patent No.: US 7,987,025 B2
(45) Date of Patent: Jul. 26, 2011

(54) STORES DEPENDENT ANGLE OF ATTACK FEEDBACK

(75) Inventors: Ola Härkegård, Linköping (SE); Robert Hillgren, Linköping (SE)

(73) Assignee: SAAB AB, Linköping (SE)

( * ) Notice: Subject to any disclaimer, the term of this patent is extended or adjusted under 35 U.S.C. 154(b) by 805 days.

(21) Appl. No.: 12/003,606

(22) Filed: Dec. 28, 2007

(65) Prior Publication Data
US 2009/0024259 A1 Jan. 22, 2009

(30) Foreign Application Priority Data
Dec. 28, 2006 (EP) .................... 06127281

(51) Int. Cl.
*G05D 1/08* (2006.01)
*B64C 13/00* (2006.01)

(52) U.S. Cl. .......................................... 701/6
(58) Field of Classification Search ............... 701/4–6; 244/181, 3.24–3.3, 17.11–17.27
See application file for complete search history.

(56) References Cited

U.S. PATENT DOCUMENTS

| | | | | |
|---|---|---|---|---|
| 3,225,693 A | * | 12/1965 | Cuttill | 244/3.15 |
| 4,619,182 A | * | 10/1986 | Hellstrom | 89/37.16 |
| 5,979,835 A | | 11/1999 | Najmabadi et al. | |
| 6,868,315 B2 | * | 3/2005 | Hellio et al. | 701/4 |
| 7,017,861 B1 | * | 3/2006 | Johansson et al. | 244/194 |
| 2004/0176860 A1 | * | 9/2004 | Hovakimyan et al. | 700/29 |

FOREIGN PATENT DOCUMENTS
EP 0193442 A 9/1986

OTHER PUBLICATIONS
European Search Report—Dec. 19, 2007.
* cited by examiner

*Primary Examiner* — Mark Hellner
*Assistant Examiner* — Ari M Diacou
(74) *Attorney, Agent, or Firm* — Venable LLP; Eric J. Franklin

(57) ABSTRACT

A method for adjusting angle of attack feedback gain based characteristics and position of mounted stores, and a control system using the method.

17 Claims, 5 Drawing Sheets

STORES DEPENDENT ANGLE OF ATTACK FEEDBACK

FIELD OF THE INVENTION

The present invention relates to a method for reading back the stores configuration of a vehicle to control the vehicle stability, computer program product that executes the method and a system as such. Specifically, the invention relates to a control system with a feedback based on stores mounted on an aircraft.

BACKGROUND TO THE INVENTION

Fourth generation multi role military fighter/attack aircrafts, which use the latest available technology; capable of performing an extensive range of air-to-air and air-to-surface operational missions; and employs the latest weapons, are often statically unstable basic aircrafts, which are held stable by continuously working electrical control systems in order to ensure the best possible performance throughout the entire flight envelope. The electrical flight control system of such an aircraft uses sensors and information from sensors that give information about the motion of the aircraft as well as outside disturbances, such as winds, gusts and the like. The information is used to stabilise the unstable aircraft and to achieve desired flight characteristics throughout the full flight envelope with the landing gear down as well as with the landing gear up. The characteristics of the aircraft can thereby be optimised during the different roles of the aircraft. The vehicle is controlled by elevons and canards. By moving the canards and elevons up, the aircraft is rotated nose up and the angle of attack of the wings is increased and lift is generated.

In document US 2005/0004723 A1 a vehicle control system is disclosed and its related subcomponents that provide a pilot with different modes of operation incorporating different levels of autonomous control. In the system a weapon payload component is used in the control of the weapons.

In older flight control system editions the aircraft is stabilised by feedback that is independent of the mounted stores. Some fighter aircraft are rather small and supposed to carry a lot of heavy stores on its pylons. Due to the export of fighter aircrafts to different countries, the aircraft must be able to vary its stores combinations depending on the client, i.e. the requirement on stores combinations from the clients varies and stores tend to be heavier and heavier. This trend results in that the aircraft must be stabilised in a different manner.

The object of the invention is to provide a control system of a vehicle with enhanced flight stability.

SUMMARY OF THE INVENTION

In order to achieve the object stated above the present invention provides a system and a method according to the independent claims.

The invention provides a method for adjusting an angle of attack feedback gain in a control system of a vehicle, wherein the method comprises the steps of; determining an angle of attack feedback gain correction value (KDALFD) based on characteristics of mounted stores; and using said gain correction value (KDALFD) to adjust feedback signals.

The characteristics of the method may comprise a mass value and/or an aerodynamical factor of the stores mounted on the vehicle.

The method may further comprise the steps of; reading the mass value of the stores mounted on the vehicle; and/or reading the aerodynamical factor of said mounted stores; wherein the mass value and the aerodynamical factor is read from a computer arranged on the vehicle.

In an embodiment of the invention the method may further comprise the step of; using the aerodynamical factor to establish a aerodynamical value ($\Delta Cm\alpha aero$) of contribution to the gain correction value (KDALFD) from a predetermined list or diagram.

In addition, the method may further comprise the step of; determining the change in pitching moment coefficient ($\Delta Cm\alpha cg$) due to mounted store position and its mass.

Furthermore, may the method comprise the step of; entering information on what kind of store is mounted and where the store is mounted on the vehicle and using this information in the step of determining the gain correction value (KDALFD).

The method may further involve that the information on where the store is mounted on certain positions, said certain positions are pylons positions; and the gain value (KDALFD) is based on the pylon position of the store.

In addition may a control stick manoeuvring the vehicle also adjusts the angle of attack feedback gain of the vehicle.

Furthermore may the gain adjusts the deflection of at least one canard forewing and/or at least one elevon of the vehicle.

The step of using said alpha feedback gain value (KDALFD) may further comprise the step of; adding the gain value (KDALFD) to previously gain values (KALFDET, KALFDCT).

Additionally, the invention relates to a control system of a vehicle arranged for adjusting angle of attack feedback gain, characterised in that the system comprises a processor arranged to determine a gains correction value (KDALFD) based on mounted store characteristics, and a feedback circuit arranged to use said gain correction value to adjust the angle of attack feedback gain.

The characteristics may comprise a mass value and/or an aerodynamical factor of the stores mounted on the vehicle.

The processor of the control system may be arranged to read the mass values of the stores mounted on the vehicle; and/or to read the aerodynamical factor of said mounted stores, from a computer arranged on the vehicle.

The processor may further be arranged to use the aerodynamical factor to establish the change in pitching moment coefficient ($\Delta Cm\alpha aero$) due to aerodynamical effects, contributing to the gain correction value (KDALFD), from a predetermined list or diagram.

The processor may also be arranged to determine the change in pitching moment coefficient due to the mass of the store and its mounted position ($\Delta Cm\alpha cg$), contributing to the gain correction value (KDALFD).

In addition, the processor may be arranged to receive input on what type of stores are mounted and where the stores are mounted on the vehicle and arranged to use this information when determining the gain correction value (KDALFD).

In an embodiment of the invention the stores are mounted on certain positions, said certain positions are pylons positions; and said processor is arranged to use the pylon position of the stores to determine the gain value (KDALFD).

The control system may further comprise a control stick that also adjusts the angle of attack feedback gain of the vehicle.

The angle of attack feed-back gain may further be arranged to adjust the deflection of at least one canard forewing and/or at least one elevon of the vehicle.

The feedback circuit may further be arranged to add/subtract the gain value (KDALFD) to previous gain values (KALFDET, KALFDCT).

The present invention further discloses a computer program product arranged to perform the method according to what is stated above when executed on a computer unit in a control system of a vehicle.

Stores dependent feedback should be used in order to handle the increasing pitch instability of the vehicle caused by the mounted stores. The stores dependent feedback gives the same flight characteristics as an aircraft without stores.

The stores dependent feedback implies that fighter aircrafts are able to carry very light stores combinations to very heavy stores combinations while maintaining good flight characteristics and with carefree properties on every axis. In an embodiment the stores dependent feedback compensates for the change of centre of gravity and aerodynamic effects due to mounted stores.

Older flight control systems are independent of the stores mounted, resulting in that flight and stability characteristics are gradually degraded with heavy and bigger stores, while the present invention provides feedback that takes the stores into account and adjusts the level of feedback gain due to the stores on the aircraft, resulting in that flight and stability characteristics are maintained even for the most extreme stores combinations. The invention may further disclose that no overshoot of the load factor limit or the angle of attack limit are obtained.

BRIEF DESCRIPTION OF THE DRAWINGS

The invention will be described in more detail below with reference to examples of embodiments and with reference to the attached drawings, of which.

Figure 1:
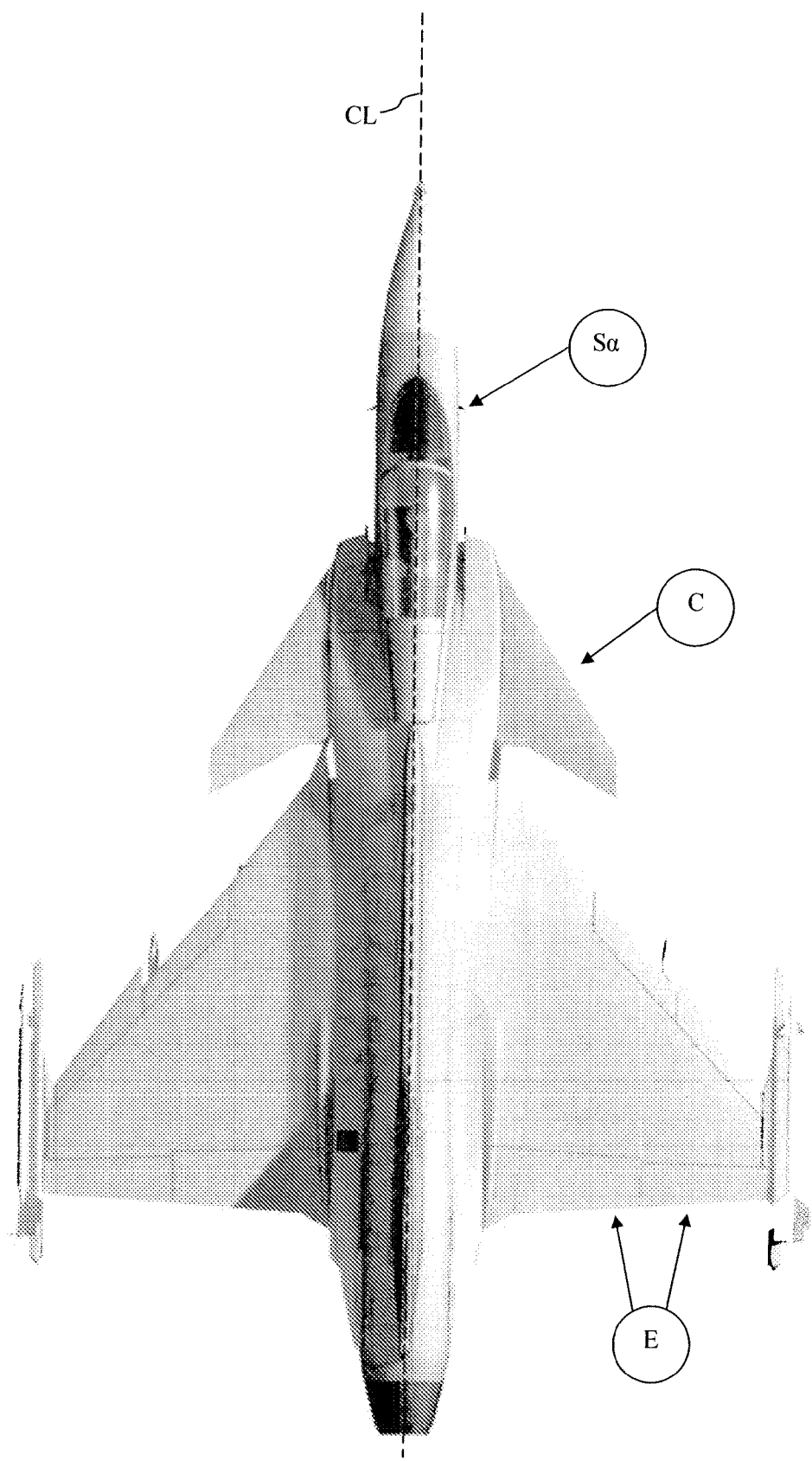
FIG. 1 is a top view of a fighter aircraft.

DETAILED DESCRIPTION OF AN
EMBODIMENT OF THE INVENTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As known from prior art, a statically unstable fighter aircraft must have a flight control system up and running in order to start a flight. The control system in a fighter aircraft has feedbacks for the pitch, the angle of attack alpha, which should stabilise the basically unstable aircraft throughout the full flight envelope. The alpha angle is the angle between where the wing is pointing and where the aircraft is going. The amount of lift generated by a wing is directly related to the angle of attack, with greater angles generating more lift. The feedback signals include pitch rate signals, load factor signals and angle of attack signals. Through the angle of attack signals the pitch stability may be controlled.

Referring to FIG. 1, an aircraft is controlled in pitch by commanding Elevons, E, and Canard forewings, C, i.e. the elevons and the canard forewings are used to control the angle of attack. In currently used control systems external alpha sensors, S$\alpha$, are used to stabilize the aircraft and adjust the angle of attack to the pilot commanded angle of attack. In order to be able to carry very heavy weapons without affecting the flight characteristics of the aircraft, a stores dependent feedback has been created. This is possible through the reliable information concerning stores, that is, loads such as weapons, bombs, tanks or the like, of the aircraft on different flight pylons that is available by the manufacturers of the stores. Today a computer unit with stores information is typically provided in each plane, a so called Stores Management Unit, SMU. The SMU is a Level A certified computer which means that the information from the SMU is reliable and may be used in a safety critical system, such as a flight control system. Now, in order to compensate for the mass of the stores and the aerodynamical influence of the stores, information from the SMU is read and used in the flight control system. The information is fed on a bus, a so called 1553-bus, to the control system and is used to adjust the angle of attack feedback gain based on the mass and the aerodynamical influence of the mounted stores, resulting in improved stability.

Figure 2:
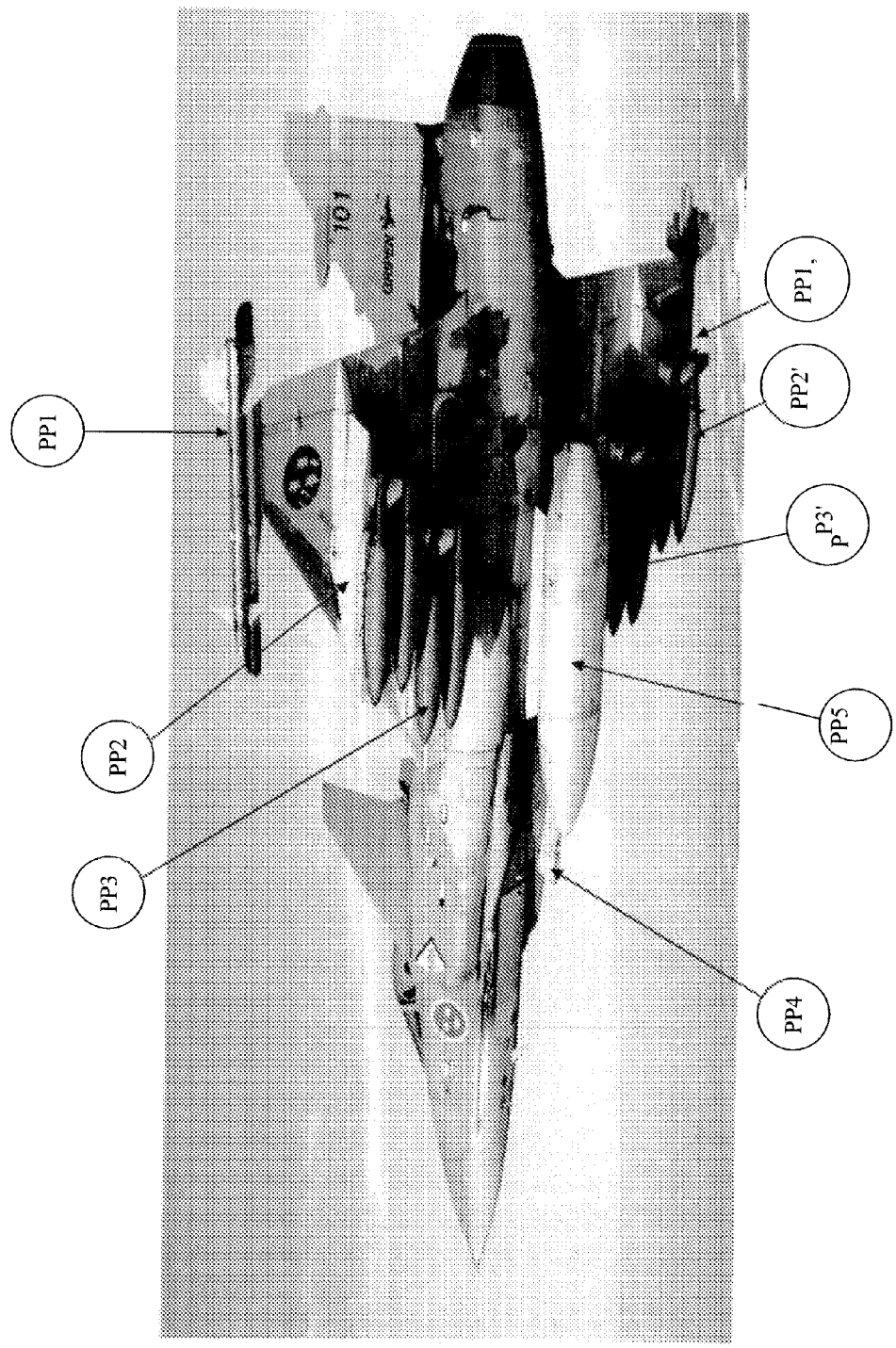
FIG. 2 is a front view of a fighter aircraft with stores mounted on different pylon positions.

The stores dependent feedback takes care of the changed pitch stability that heavy voluminous stores cause. FIG. 2 shows an embodiment of an air fighter arranged with eight pylon positions, three on each wing on either side of a centre line (indicated as CL in FIG. 1) of the vehicle and two arranged on the centre line of the aircraft. Pylon positions are predetermined positions on the aircraft body where stores may be mounted. Pylon positions 1, PP1 and PP1', are arranged furthest from the centre line of the aircraft out on each wing tip. Pylon positions 2, PP2 and PP2', are arranged under each wing closer to the centre line of the vehicle than pylon positions 1. Pylon positions 3, PP3 and PP3', are arranged under each wing closer to the centre line of the vehicle than pylon positions 2. Pylon position 4 is arranged at the centre line of the vehicle in front of the wings and pylon position 5 is arranged at the centre line behind pylon position 4. In the illustrated example bombs are mounted in pylon position three, PP3, and similar bombs are mounted in pylon position two, PP2. The stores dependent feedback may be able to take care of the changed pitch stability that arises due to all heavy bombs and other stores mounted in all the different pylon positions. However, it has been established that the pitch stability is mainly influenced by stores positioned in pylon positions two, three and four, PP2-PP4, whereas stores in pylon position one, PP1, and pylon position five, PP5, do not influence the pitch stability as much. Therefore, in an embodiment of the present invention the calculation has been simplified by only taking into consideration the stores mounted in pylon positions two PP2, three PP3 and four PP4, It should be noted, however, that in an embodiment of the present invention all weapons in all the different pylon positions can be taken into consideration.

The pitch stability is increased by adding an extra alpha feedback value, KDALFD (Constant Delta Alpha), to the original feedbacks according to the expression:

$$KDALFD = -\Delta Cm\alpha/(Cm\delta e - Cm\delta c)$$

where:

$\Delta Cm\alpha$ is the changed stability contribution from the heavy voluminous stores in pylon positions two, three and four, PP2-PP4;

$Cm\delta e$ is the pitching moment coefficient from the elevons; and $Cm\delta c$ is the pitching moment coefficient from the canards.

The term ($Cm\delta e - Cm\delta c$) may be simplified by referring to it as controls efficiency, $Cm\delta$.

By identifying the stores that are mounted in each pylon position, KDALFD may be calculated and the angle of attack feedback may be adjusted according to the influence of the stores on the pitch stability.

Figure 3:
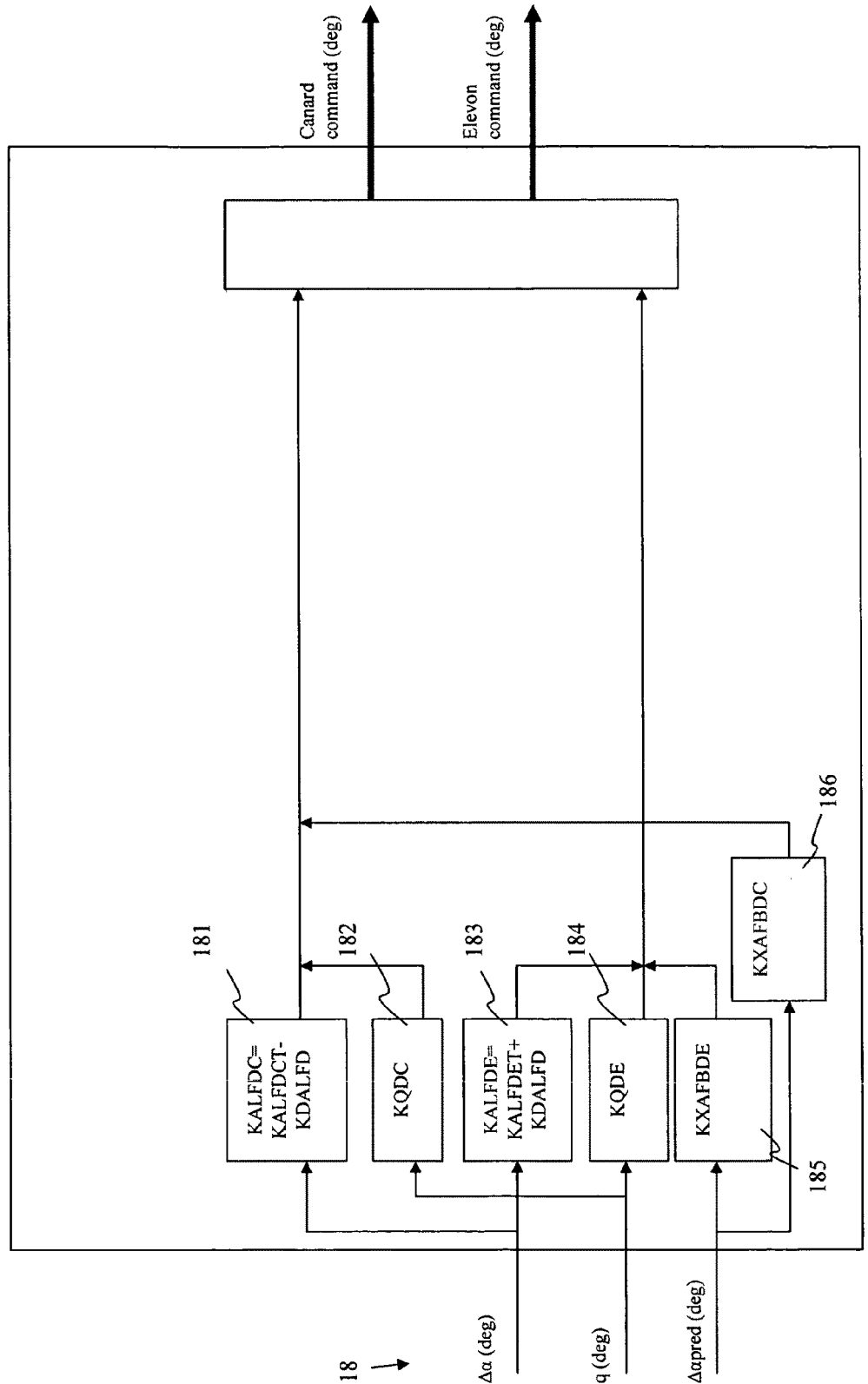
FIG. 3 is an overview of a control system comprising pitch control laws with feedbacks.

KDALFD is a value that adjusts the regular feedback control laws as shown in FIG. 3. FIG. 3 is a simplified feedback block diagram for the pitch axis.

The feedback system 18 uses in general voted and position compensated angle of attack, $\Delta\alpha$, from the alpha sensors S$\alpha$ (see FIG. 1) and voted pitch rate, q, from the gyros. As shown in the illustrated embodiment, $\Delta\alpha$ and q are taken into account when calculating the commands to the canards as well as to the elevons. In the present invention the flight control system feedback also takes the influence from mounted stores on the aircraft into account. In the illustrated embodiment the angle of attack to canard feedback gain KALFDC, 181, is adjusted by subtracting the value KDALFD from an original gain to the canard value KALFDCT to form the total feedback gain KALFDC=KALFDCT-KDALFD. Similarly, the angle of attack to elevon feedback gain KALFDE, 183, is adjusted by adding the value KDALFD to an original gain to the elevon value KALFDET to form the total gain KALFDE=KALFDET+KDALFD. As shown in FIG. 3, KQDC 182 and KQDE 184 are feedback gains from pitch rate q to canard and elevon commands, respectively. KXAFBDE 185 and KZAFBDC 186 are feedback gains from predicted angle of attack ($\Delta\alpha$pred) to elevon and canard commands, respectively, used to prevent overshoots of the angle of attack limit.

These adjusted feedback signals are fed to the elevon command, 20, and the canard command, 22.

Figure 4:
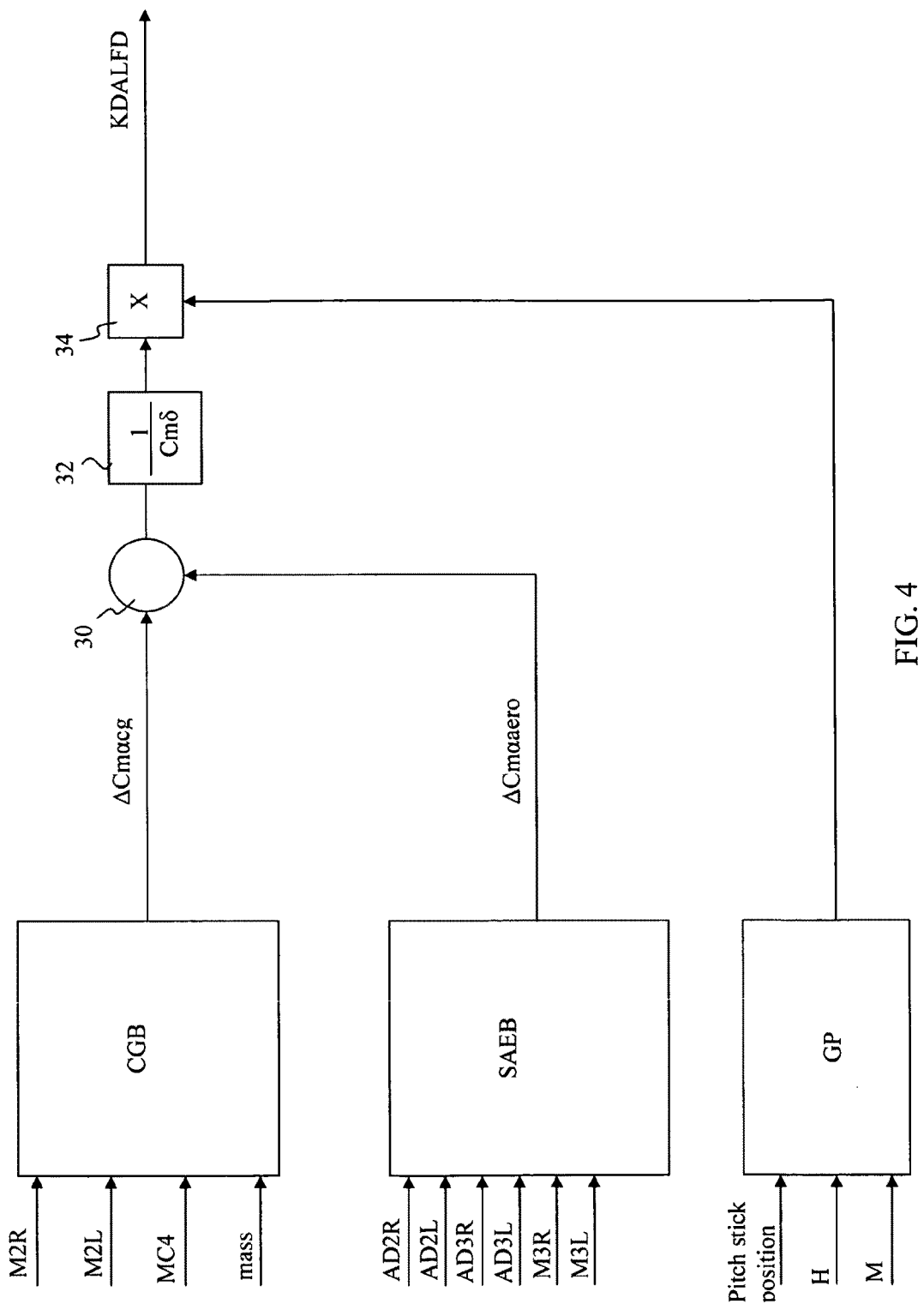
FIG. 4 is an overview of a stores dependent feedback system.

Referring to FIG. 4, the process of generating the additional stores dependent feedback, KDALFD, which is preformed on a processor in the control system, is schematically disclosed. The mounted stores will change the position of the centre of gravity depending on store weight and pylon position. In the illustrated embodiment of the present invention there are four parameters entered into the first function block called centre of gravity block, CGB. Namely, the mass of the stores mounted in pylon position two, right wing, M2R, and left wing, M2L, are entered into the CGB. Furthermore, the mass of the store mounted in the centre pylon position 4, MC4, is taken into consideration as well and input to the CGB as well as the mass of the entire aircraft, mass. In the function block CGB the mass is used as well as the levers to pylon positions two and four in order to calculate the added pitching moment. It should here be noted that the mass of all stores mounted on the aircraft may be taken into account, just as, only stores mounted on one pylon position may be considered. As stated above the mass values are taken from a level A certified computer, SMU, providing a list of masses for existing stores. From the CGB block, the contribution to the pitching moment coefficient as a function of angle of attack is denoted as $\Delta Cm\alpha cg$.

Further referring to the embodiment of FIG. 4, a second function block is disclosed; herein referred to as the stores aerodynamic effect block, SAEB. In the SAEB the add-on value, $\Delta Cm\alpha aero$, to the pitching moment coefficient due to the aerodynamic effect of the mounted stores is calculated. Aerodynamic, AD, values of the stores mounted in pylon position two and three, left and right, AD2L, R and AD3L, R, are input to the block SAEB. These AD-values are taken from the Level A certified SMU. In SMU stores/weapons are grouped into groups of aerodynamically similar effects. For example, in an embodiment of the SMU stores/weapons are grouped into 6 groups of aerodynamical effects. In the SAEB block the AD-value of the stores is translated into an incremental $Cm\alpha aero$ value, from, for example, a process, graph, list, table or the like. For stores in polyn position 3 the incremental $Cm\alpha aero$ value is also dependent on stores mass, M3L, R. However, in a different embodiment of the invention the mass of the stores in the second pylon position, or other pylon positions may be taken into consideration as well when generating the $Cm\alpha aero$-values.

The different incremental $Cm\alpha aero$-values generated in the SAEB block are added together into $\Delta Cm\alpha aero$.

The $\Delta Cm\alpha cg$ from block CGB and the $\Delta Cm\alpha aero$ from block SAEB are added in block 30 and transformed, using nominal control efficiency, simplified $$\frac{1}{Cm\delta},$$

to a basic angle of attack feedback gain in block 32.

In a third function block GP of the embodiment illustrated in FIG. 4, a speed, M, and an altitude, H, of the aircraft are entered as well as a pitch position of the pilot control stick. These are all values that are used in order to generate carefree manoeuvring of the aircraft. Pilot pitch stick position provides distribution of an extra alpha feedback gain as a function of the pilot commanded angle of attack. In this embodiment the extra angle of attack gain is used only in the subsonic region, M<1.0. The altitude H is used to take care of changes in control efficiency as a function of H. This extra angle of attack gain is taken into account to the basic angle of attack feedback gain in block 34.

Figure 5:
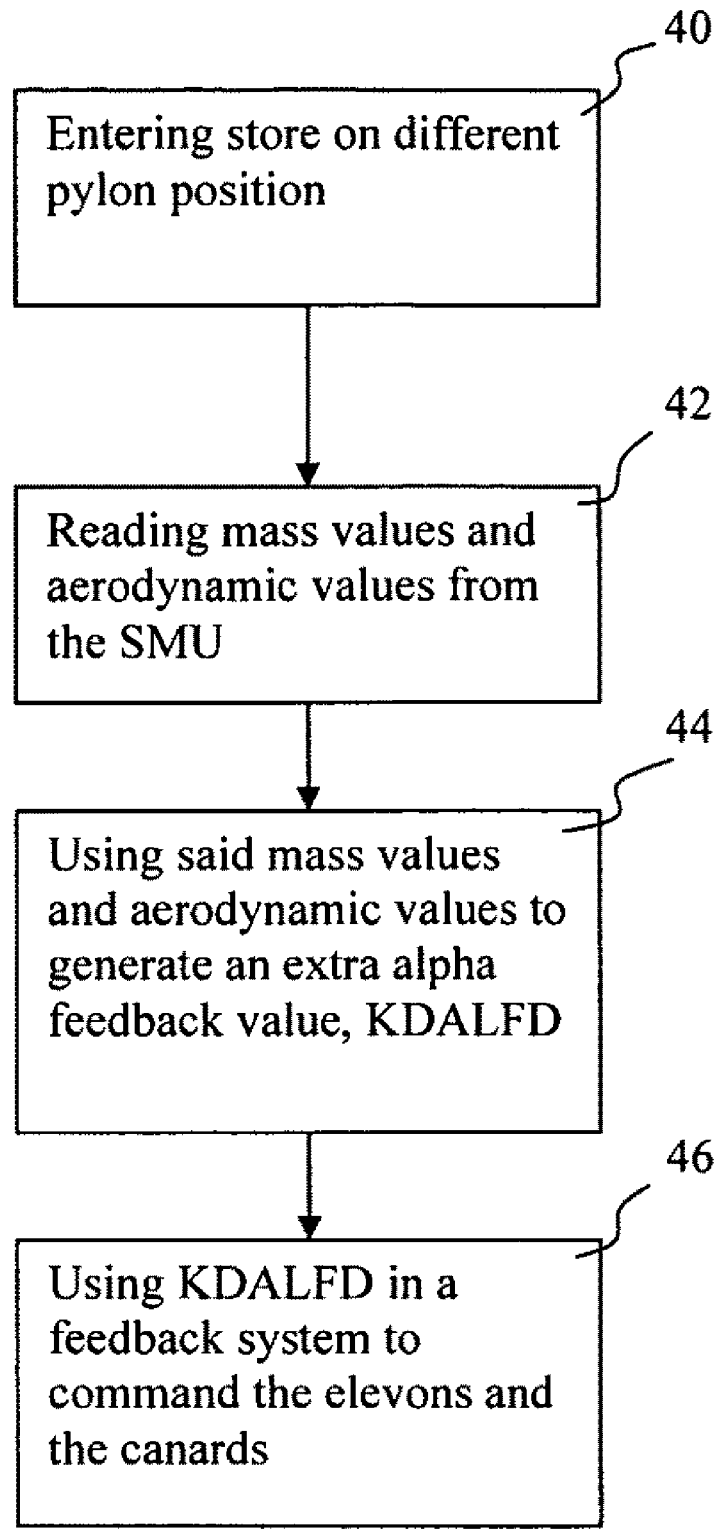
FIG. 5 is a schematic flow chart of a method of enhancing flight stability of an aircraft according to an embodiment of the present invention.

Referring to FIG. 5, a schematic flow chart of a method of enhancing flight stability of an aircraft according to an embodiment of the present invention is shown. In step 40, the different mounted stores at different pylon positions, in the embodiment stated above PP2, PP3 and PP4, are entered into the system of the aircraft. It should here be understood that in an embodiment of the invention all stores on all the different pylon positions are entered into the system and the order of entering the loads mounted in the different pylon positions may be in any order.

In step 42 the mass values and the aerodynamic values of the different mounted stores are retrieved from a computer unit, such as a Level A certified SMU, to the processor that calculates an extra alpha feedback value, KDALFD.

In step 44 these values are then used in the calculation of the KDALFD, e.g. in accordance with what is disclosed in FIG. 4.

In step 46, the KDALFD is used to adjust the gain from angle of attack to the elevons and the canards of the aircraft in order to adjust the gain in the control system of the aircraft. This results in an enhanced flight stability of the aircraft.

Now referring to results when the extra alpha feedback value, KDALFD, is used compared to when it is not used. The extra alpha feedback gain improves the stability of the aircraft with stores mounted. This results in no overshoot of the angle of attack limit or load factor limit when the pilot makes a stick aft command to softstop or a stick forward command to the stick command stop. This is carefree manoeuvring. The extra alpha feedback also reduces the deflection of the elevons and canards for pilot command and it also reduces control surface rates.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. A method for adjusting an angle of attack feedback gain in a control system of a vehicle, the method comprising:
   reading a mass value of stores mounted on the vehicle and/or reading an aerodynamic factor of said mounted stores; wherein the mass value and/or the aerodynamic factor is read from a computer arranged on the vehicle;
   determining an angle of attack feedback gain correction value based on characteristics of mounted stores, wherein the characteristics comprise a mass value and/or an aerodynamic factor of the stores mounted on the vehicle; and
   using said gain correction value to adjust feedback signals.

2. A method for adjusting an angle of attack feedback gain in a control system of a vehicle, the method comprising:
   determining an angle of attack feedback gain correction value based on characteristics of mounted stores, wherein the characteristics comprise a mass value and/or an aerodynamic factor of the stores mounted on the vehicle;
   using said gain correction value to adjust feedback signals; and
   using the aerodynamic factor to establish an aerodynamic value of contribution to the gain correction value from a predetermined list or diagram.

3. The method according to claim 1, further comprising:
   determining the change in pitching moment coefficient due to mounted store position and its mass.

4. A method for adjusting an angle of attack feedback gain in a control system of a vehicle, the method comprising:
   entering information on what kind of store is mounted and where the store is mounted on the vehicle and using this information in the step of determining the gain correction value;
   determining an angle of attack feedback gain correction value based on characteristics of mounted stores; and
   using said gain correction value to adjust feedback signals.

5. The method according to claim 4, wherein the information on where the store is mounted on certain positions, said certain positions are pylons positions; and the gain value is based on the pylon position of the store.

6. The method according to claim 1, wherein a control stick maneuvering the vehicle also adjusts the angle of attack feedback gain of the vehicle.

7. The method according to claim 1, wherein the gain adjusts the deflection of at least one canard forewing and/or at least one elevon of the vehicle.

8. The method according to claim 1, wherein using said alpha feedback gain value further comprises adding the gain value to previously gain values.

9. A control system of a vehicle arranged for adjusting angle of attack feedback gain, the system comprising:
- a processor arranged to determine a gains correction value based on mounted store characteristics, wherein the characteristics comprise a mass value and/or an aerodynamic factor of the stores mounted on the vehicle, and wherein the processor is arranged to use the aerodynamic factor to establish the change in pitching moment coefficient due to aerodynamic effects, contributing to the gain correction value, from a predetermined list or diagram, and
- a feedback circuit arranged to use said gain correction value to adjust the angle of attack feedback gain.

10. The control system according to claim 9, wherein the processor is arranged to read the mass values of the stores mounted on the vehicle; and/or to read the aerodynamic factor of said mounted stores, from a computer arranged on the vehicle.

11. A control system of a vehicle arranged for adjusting angle of attack feedback gain, the system comprising:
- a processor arranged to determine a gains correction value based on mounted store characteristics, wherein the characteristics comprise a mass value and/or an aerodynamic factor of the stores mounted on the vehicle, and
- a feedback circuit arranged to use said gain correction value to adjust the angle of attack feedback gain
- wherein the processor is arranged to determine the change in pitching moment coefficient due to the mass of the store and its mounted position, contributing to the gain correction value.

12. A control system of a vehicle arranged for adjusting angle of attack feedback gain, the system comprising:
- a processor arranged to determine a gains correction value based on mounted store characteristics, and
- a feedback circuit arranged to use said gain correction value to adjust the angle of attack feedback gain
- wherein the processor is arranged to receive input on what type of stores are mounted and where the stores are mounted on the vehicle and arranged to use this information when determining the gain correction value.

13. A control system of a vehicle arranged for adjusting angle of attack feedback gain, the system comprising:
- a processor arranged to determine a gains correction value based on mounted store characteristics, and
- a feedback circuit arranged to use said gain correction value to adjust the angle of attack feedback gain
- wherein the stores are mounted on certain positions, said certain positions are pylons positions; and said processor is arranged to use the pylon position of the stores to determine the gain value.

14. The control system according to claim 9, wherein a control stick also adjusts the angle of attack feedback gain of the vehicle.

15. The control system according to claim 9, wherein the angle of attack feedback gain is arranged to adjust the deflection of at least one canard forewing and/or at least one elevon of the vehicle.

16. The control system according to claim 9, wherein the feedback circuit is arranged to add/subtract the gain value to previous gain values.

17. A non-transitory computer readable medium, comprising:
- computer program instructions recorded on the computer readable medium and executable by a processor for carrying out a method for adjusting an angle of attack feedback gain in a control system of a vehicle, the method comprising reading a mass value of stores mounted on the vehicle and/or reading an aerodynamic factor of said mounted stores; wherein the mass value and/or the aerodynamic factor is read from a computer arranged on the vehicle; determining an angle of attack feedback gain correction value based on characteristics of mounted stores, wherein the characteristics comprise a mass value and/or an aerodynamic factor of the stores mounted on the vehicle; and using said gain correction value to adjust feedback signals.

* * * * *